No. 619,749. Patented Feb. 21, 1899.
W. A. HOOKS.
CUTTER FOR BISCUITS, CAKES, OR OTHER ARTICLES.
(Application filed May 6, 1898.)
(No Model.)

WITNESSES
John Buckler,
M. R. Knowles.

INVENTOR
William A. Hooks,
BY
Edgar Tate & Co.
ATTORNEYS.

THE NORRIS PETERS CO., PHOTO-LITHO., WASHINGTON, D. C.

UNITED STATES PATENT OFFICE.

WILLIAM ALEXANDER HOOKS, OF MACON, GEORGIA, ASSIGNOR OF ONE-HALF TO FRANK DISROON, OF SAME PLACE.

CUTTER FOR BISCUITS, CAKES, OR OTHER ARTICLES.

SPECIFICATION forming part of Letters Patent No. 619,749, dated February 21, 1899.

Application filed May 6, 1898. Serial No. 679,943. (No model.)

*To all whom it may concern:*

Be it known that I, WILLIAM ALEXANDER HOOKS, a citizen of the United States, residing at Macon, in the county of Bibb and State of Georgia, have invented certain new and useful Improvements in Cutters for Biscuits, Cakes, or other Articles, of which the following is a full and complete specification, such as will enable those skilled in the art to which it appertains to make and use the same.

This invention relates to devices for cutting out biscuits, cakes, cookies, and similar articles; and the object thereof is to provide an improved device of this class which may be used as an ordinary biscuit-cutter and which is provided with a detachable attachment whereby slits or grooves may be cut in the upper side of cakes, cookies, and similar articles; and with this and other objects in view the invention consists in the construction, combination, and arrangement of parts hereinafter described and claimed.

The invention is fully disclosed in the following specification, of which the accompanying drawings form a part, in which—

Figure 1:
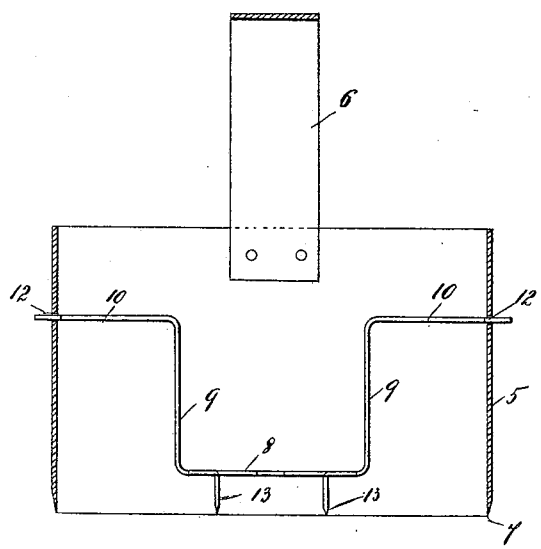
Figure 2:
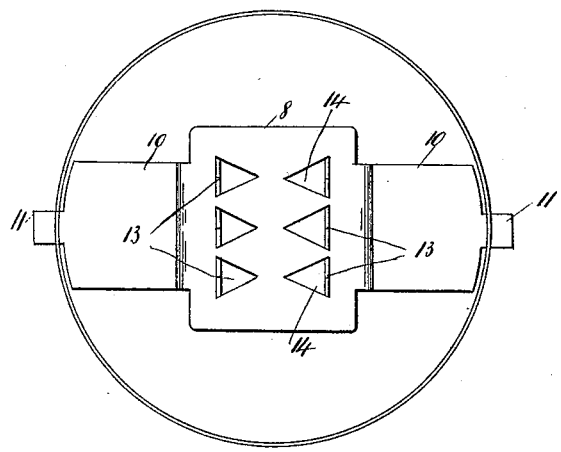

Figure 1 is a sectional side elevation of my improved cutter, and Fig. 2 is a bottom plan view thereof.

In the drawings forming part of this specification the separate parts of my improvement are designated by the same numerals of reference in each of the views, and in the practice of my invention I provide a cutter 5, which is of the usual form, preferably composed of sheet metal and cylindrical in shape, and connected with the top thereof is a yoke-shaped handle 6, and the bottom 7 is provided with a cutting edge. I also provide a detachable attachment which is designed for use in cutting slits in the upper side of a biscuit, cake, cooky, or other article, and this attachment consists of a yoke having a cross head or plate 8 and upwardly-directed sides 9, the upper ends of which are bent outwardly at right angles to form arms 10, which are provided with extensions 11, which project through corresponding openings 12 in the opposite sides of the main cutter 5.

The cross head or plate 8 of the yoke-shaped attachment is provided with downwardly-directed prongs or blades 13, which are cut from the material of said cross head or plate and bent downwardly, and this operation forms triangular holes or openings 14 in said cross head or plate, and the prongs or blades 13 may be of any desired shape, and the relative positions of the separate parts are such that the cross head or plate 8 of the attachment is held when in position at a predetermined distance above the bottom edge 7 of the main or cylindrical cutter 5.

When it is desired to cut biscuits without forming slits or grooves in the upper side thereof, the attachment is disconnected from the cylindrical cutter 5 by forcing the extensions 11 of the arms 10 inwardly, said attachment being composed of spring metal, and when it is desired to cut the cakes or cookies or similar articles and to form slits or grooves in the top or upper side thereof the attachment is placed in position, as shown in the drawings, and the operation is the same as that of other devices of this class, it being understood that when the cake, cooky, or other article is cut out the prongs or blades 13 will form the required slits or grooves in the upper side thereof.

My improvement is simple in construction and operation and well adapted to accomplish the result for which it is intended, and it will be apparent that changes in and modifications of the construction herein described may be made without departing from the spirit of my invention or sacrificing its advantages.

The cross head or plate 8 is shown as rectangular in shape; but the same may be circular in form, if desired, and should be supported concentrically in the cutter 5.

Having fully described my invention, I claim as new and desire to secure by Letters Patent—

1. A cutter for biscuits, cakes and other articles, said cutter being provided with a detachable attachment, comprising a cross plate or head and upwardly-directed sides having outwardly-directed arms, said arms being provided with extensions which pass through the sides of the cutter and said cross head or plate being provided with downwardly-directed prongs or blades, substantially as shown and described.

2. In a device of the character herein described, a cutter 5 provided at the top with a handle and at the bottom with a cutting edge and a detachable attachment, consisting of a plate or head having upwardly-directed spring sides which are provided with outwardly-directed arms, said arms being provided with extensions which pass through the openings in the sides of the cutter, substantially as shown and described.

In testimony that I claim the foregoing as my invention I have signed my name, in presence of the subscribing witnesses, this 28th day of April, 1898.

WILLIAM ALEXANDER HOOKS.

Witnesses:
A. R. TINSLEY,
BRIDGES SMITH.